United States Patent
Kuo et al.

(10) Patent No.: US 7,637,251 B2
(45) Date of Patent: Dec. 29, 2009

(54) METHOD AND APPARATUS TO DETERMINE MAGNITUDE OF COMBUSTION CHAMBER DEPOSITS

(75) Inventors: Tang-Wei Kuo, Troy, MI (US); Paul M. Najt, Bloomfield Hills, MI (US); James A. Eng, Troy, MI (US); Rodney B. Rask, Grosse Pointe Woods, MI (US); Orgun A. Guralp, Ann Arbor, MI (US); Zoran S. Filipi, Ann Arbor, MI (US); Dionissios N. Assanis, Ann Arbor, MI (US); Mark A. Hoffman, Ann Arbor, MI (US)

(73) Assignees: GM Global Technology Operations, Inc., Detroit, MI (US); University of Michigan, Ann Arbor, MI (US)

( * ) Notice: Subject to any disclaimer, the term of this patent is extended or adjusted under 35 U.S.C. 154(b) by 0 days.

(21) Appl. No.: 12/048,477

(22) Filed: Mar. 14, 2008

(65) Prior Publication Data

US 2008/0156081 A1  Jul. 3, 2008

Related U.S. Application Data

(62) Division of application No. 11/399,194, filed on Apr. 6, 2006, now Pat. No. 7,367,319.

(60) Provisional application No. 60/737,156, filed on Nov. 16, 2005.

(51) Int. Cl.
*F02B 5/00* (2006.01)
*G01L 3/26* (2006.01)

(52) U.S. Cl. .................. 123/435; 123/305; 73/114.02

(58) Field of Classification Search .......... 701/101, 701/103, 111–115; 123/295, 305, 350, 676–679, 123/687, 406.22, 435, 568.22, 434, 406.26, 123/443

See application file for complete search history.

(56) References Cited

U.S. PATENT DOCUMENTS

| | | | |
|---|---|---|---|
| 4,074,671 A | | 2/1978 | Pennila |
| 4,463,601 A | | 8/1984 | Rask |
| 4,489,595 A | | 12/1984 | Klomp et al. |
| 4,612,880 A | | 9/1986 | Brass et al. |
| 4,827,883 A | | 5/1989 | Khalighi et al. |
| 4,869,224 A | * | 9/1989 | Ishikawa et al. ............ 123/682 |
| 4,919,088 A | | 4/1990 | Krieger et al. |

(Continued)

OTHER PUBLICATIONS

Kamo, R., Thin Thermal Barrier Coatings for Engines, SAE Technical Paper Series, Feb. 27, 1989, pp. 23-28, No. 890143, SAE, Warrendale, PA, USA.

(Continued)

*Primary Examiner*—Stephen K Cronin
*Assistant Examiner*—Johnny H Hoang

(57) ABSTRACT

A method to dynamically determine a parametric value for combustion chamber deposits (CCD), e.g. in a controlled auto-ignition engine, including in-situ evaluation of thickness of CCD, based on a sensor which monitors combustion in a homogeneous charge compression ignition engine. It includes a temperature sensor operative to monitor the combustion chamber, and a CCD parameter that is based upon a peak combustion temperature measured at a crank angle. A CCD parameter can also be determined utilizing an in-cylinder pressure monitor, wherein a combustion chamber deposit parameter is based upon crank angle location of a peak in-cylinder pressure parameter.

9 Claims, 4 Drawing Sheets

U.S. PATENT DOCUMENTS

| | | | |
|---|---|---|---|
| 4,969,330 | A | 11/1990 | Groff et al. |
| 5,097,807 | A | 3/1992 | Oikawa et al. |
| 5,544,635 | A | 8/1996 | Hara et al. |
| 5,546,915 | A | 8/1996 | Isobe |
| 5,766,693 | A | 6/1998 | Rao |
| 5,854,990 | A | 12/1998 | Reckzugel et al. |
| 5,960,772 | A | 10/1999 | Tracy et al. |
| 6,159,554 | A | 12/2000 | Kloft et al. |
| 6,280,796 | B1 | 8/2001 | Kloft et al. |
| 6,354,264 | B1 * | 3/2002 | Iwakiri et al. ............... 123/305 |
| 6,390,054 | B1 | 5/2002 | Yang |
| 6,450,136 | B1 | 9/2002 | Klomp et al. |
| 6,484,694 | B2 | 11/2002 | Thomas |
| 6,494,178 | B1 | 12/2002 | Cleary et al. |
| 6,543,418 | B2 * | 4/2003 | Lavy ........................ 123/435 |
| 6,588,396 | B1 | 7/2003 | Cleary et al. |
| 6,595,181 | B2 | 7/2003 | Najt et al. |
| 6,640,754 | B1 | 11/2003 | Iida |
| 6,659,068 | B2 * | 12/2003 | Urushihara et al. ......... 123/295 |
| 6,659,082 | B1 * | 12/2003 | Gruden et al. ............. 123/435 |
| 6,662,785 | B1 | 12/2003 | Sloane et al. |
| 6,701,882 | B2 | 3/2004 | Barbezat |
| 6,832,593 | B2 | 12/2004 | Imoehl |
| 6,845,314 | B2 | 1/2005 | Fosseen |
| 6,848,421 | B1 * | 2/2005 | Karau et al. ........... 123/406.22 |
| 6,877,473 | B2 | 4/2005 | Bischofberger et al. |
| 6,923,167 | B2 | 8/2005 | Flowers |
| 6,971,365 | B1 | 12/2005 | Najt et al. |
| 6,983,732 | B2 | 1/2006 | Kuo et al. |
| 6,994,072 | B2 | 2/2006 | Kuo et al. |
| 7,000,596 | B2 | 2/2006 | Zurloye et al. |
| 7,004,124 | B2 | 2/2006 | Kuo et al. |
| 7,021,277 | B2 | 4/2006 | Kuo et al. |
| 7,040,266 | B1 | 5/2006 | Sun et al. |
| 7,059,281 | B2 | 6/2006 | Kuo et al. |
| 7,080,613 | B2 | 7/2006 | Kuo et al. |
| 7,111,454 | B2 | 9/2006 | Fulcher et al. |
| 7,128,047 | B2 | 10/2006 | Kuo et al. |
| 7,128,062 | B2 | 10/2006 | Kuo et al. |
| 7,134,427 | B2 | 11/2006 | Colucci et al. |
| 7,150,250 | B2 | 12/2006 | Kuo et al. |
| 7,152,559 | B2 | 12/2006 | Kuo et al. |
| 7,178,507 | B1 * | 2/2007 | Gangopadhyay ............ 123/435 |
| 7,246,597 | B2 | 7/2007 | Kuo et al. |
| 7,480,558 | B2 * | 1/2009 | Kang et al. ................. 701/108 |
| 2003/0136367 | A1 | 7/2003 | Southerland |
| 2003/0150419 | A1 | 8/2003 | Daragheh et al. |
| 2004/0050359 | A1 | 3/2004 | Imoehl |
| 2004/0069286 | A1 | 4/2004 | Knowles |
| 2004/0084024 | A1 * | 5/2004 | Malaczynski et al. ....... 123/435 |
| 2004/0089260 | A1 | 5/2004 | Nozaki et al. |
| 2004/0226547 | A1 | 11/2004 | Holzleitner et al. |
| 2005/0028764 | A1 | 2/2005 | Mitani et al. |
| 2005/0065706 | A1 | 3/2005 | Gray, Jr. |
| 2005/0284441 | A1 | 12/2005 | Liu et al. |
| 2005/0288846 | A1 | 12/2005 | Liu et al. |
| 2007/0084449 | A1 | 4/2007 | Najt et al. |

OTHER PUBLICATIONS

Assanis, D, Evaluation of Alternative Thermocouple Designs for Transient Heat Transfer Measurements in Metal and Ceramic Engines, SAE Technical Paper Series, Feb. 27, 1989, pp. 168-184, No. 890571, SAE, Warrendale, PA, USA.

Cheng, S.S., Effect of Engine Operating Parameters on Engine Combustion Chamber Deposits, SAE Technical Paper Series, Oct. 22, 1990, No. 902108, SAE, Warrendale, PA USA.

Nakic, D.J., Effect of Elevated Piston Temperature on Combustion Chamber Deposit Growth, SAE Technical Paper Series, 1994, pp. 1-13, No. 940948, SAE, Warrendale, PA, USA.

Hopwood, A.B., A Technique to Measure Thermal Diffusivity and Thickness of Combustion Chamber Deposits In-Situ, SAE Technical Paper Series, Oct. 19, 1998, pp. 1-10, No. 982590 SAE, Warrendale, PA, USA.

Nishiwaki, K., The Determination of Thermal Properties of Engine Combustion Chamber Deposits, SAE Technical Paper Series, Mar. 6, 2000, pp. 1-14, No. 2000-01-1215, SAE, Warrendale, PA, USA.

* cited by examiner

METHOD AND APPARATUS TO DETERMINE MAGNITUDE OF COMBUSTION CHAMBER DEPOSITS

CROSS REFERENCE TO RELATED APPLICATIONS

The application is a divisional of and claims priority to U.S. patent application Ser. No. 11/399,194 entitled "METHOD AND APPARATUS TO DETERMINE MAGNITUDE OF COMBUSTION CHAMBER DEPOSITS" filed on Apr. 6, 2006 now U.S. Pat. No. 7,367,319 which is hereby incorporated herein by reference, which claims priority to U.S. Provisional Application No. 60/737,156, filed Nov. 16, 2005, entitled "METHOD AND APPARATUS TO CONTROL COMBUSTION IN A HOMOGENEOUS CHARGE COMPRESSION-IGNITION ENGINE."

TECHNICAL FIELD

This disclosure pertains generally to internal combustion engine control systems, and more specifically to operation of a homogeneous charge compression ignition engine.

BACKGROUND

An internal combustion engine operating under various conditions can experience a build-up of combustion chamber deposits ('CCD'), which comprise a deposition of products of the combustion process onto surfaces of the combustion chamber. The deposits are typically derived from fuels and fuel additives, lubricating oils and oil additives, and other elements, as is known.

As deposits adhere to surfaces of the combustion chamber, thermal characteristics of the engine change. This is primarily due to the combustion chamber deposits acting as an insulating layer on the combustion chamber surfaces, which affects combustion. The result of the formation of the insulating layer includes a decrease in maximum and average heat flux away from the combustion chamber, a decrease in heat transfer to engine coolant, and a decrease in engine breathability, i.e. air flow, leading to a reduced volumetric efficiency. Furthermore, the resultant effects include reduced engine power, a potential for increase in NOx emissions, and an increased likelihood of pre-ignition, or knock. There may be a benefit of improved fuel economy and reduced $CO_2$ emissions.

It is known that to improve thermal efficiency of gasoline internal combustion engines, dilute combustion—using either air or re-circulated exhaust gas—gives enhanced thermal efficiency and low NOx emissions. However, there is a limit at which an engine can be operated with a diluted mixture because of misfire and combustion instability as a result of a slow burn. Known methods to extend the dilution limit include operating the engine under controlled auto-ignition combustion.

One engine system being developed for controlled auto-ignition combustion operation comprises an internal combustion engine designed to operate under an Otto cycle. The engine is preferably equipped with direct in-cylinder fuel-injection and a spark ignition system to supplement the auto-ignition process under limited operating conditions. Such engines are referred to as Homogeneous Charge Compression Ignition, or HCCI engines.

In the HCCI engine, a charge mixture of combusted gases, air, and fuel is created in a combustion chamber, and auto-ignition is initiated simultaneously from many ignition sites within the charge mixture during a compression stroke, resulting in stable power output and high thermal efficiency. Since combustion is highly diluted and uniformly distributed throughout the charge mixture, the burnt gas temperature and hence NOx emissions are typically substantially lower than NOx emissions of a traditional spark ignition engine, and of a traditional diesel engine.

A typical HCCI engine is distinguishable from a spark-ignition engine in that ignition of the charge mixture is caused by compression of the charge mixture. A typical HCCI engine is distinguishable from a compression-ignition engine in that the compression-ignition engine initiates ignition of the combustion charge by injection of fuel, whereas the fuel charge for the typical HCCI engine is preferably injected into the combustion chamber at a time prior to start of ignition of the charge mixture.

Due to different operating characteristics, when combustion chamber deposits are formed on surfaces of a combustion chamber for the typical HCCI engine, there is a resultant change in timing of auto-ignition of the charge mixture and a change in rate of heat release during charge ignition, leading to varying combustion performance over time.

It is advantageous to have a device and apparatus that provides a parametric measure of combustion chamber deposits for use in a control system for an internal combustion engine, including one intended to operate using a controlled auto-ignition process. By way of example, one such engine control system is described in commonly assigned U.S. patent application Ser. No. 11/398,776, now U.S. Pat. No. 7,246,597 entitled METHOD AND APPARATUS TO OPERATE A HOMOGENEOUS CHARGE COMPRESSION-IGNITION ENGINE, which describes control aspects of engine operation to accommodate changes in thermal characteristics of the combustion chamber due to combustion chamber deposits.

Therefore, there is a need for a practical way to determine a parametric value for combustion chamber deposits, which can be used as a control input for an engine control system which can account for observed changes in combustion phasing and burn rate. Combustion deposits are known to influence effective instantaneous thermal properties on the surface of combustion chamber walls.

SUMMARY

An internal combustion engine is adapted to be operative in a controlled auto-ignition combustion mode. The engine is a spark-ignition, direct-injection, four-stroke, internal combustion engine including a variable volume combustion chamber defined by a piston reciprocating within a cylinder between top-dead-center and bottom-dead-center points and a cylinder head. The piston is operably connected to a rotating crankshaft. A method for determining a parameter for combustion chamber deposits includes monitoring a combustion parameter, and determining a combustion chamber deposit parameter based upon the combustion parameter.

BRIEF DESCRIPTION OF THE DRAWINGS

One or more embodiments will now be described, by way of example, with reference to the accompanying drawings, in which.

DETAILED DESCRIPTION

Figure 1:
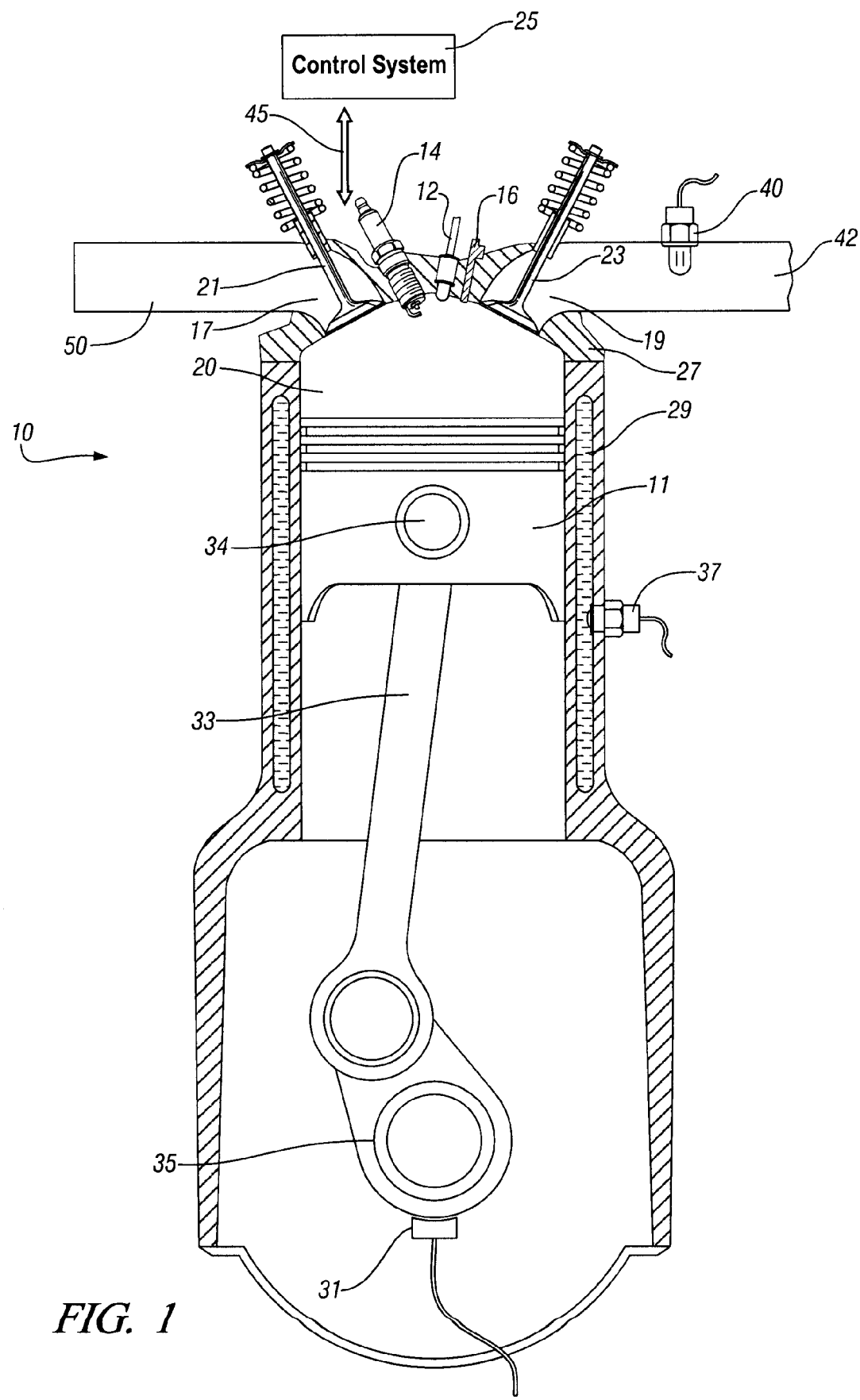
FIG. 1 is a schematic illustration of an internal combustion engine, in accordance with the present disclosure.
Figure 2:
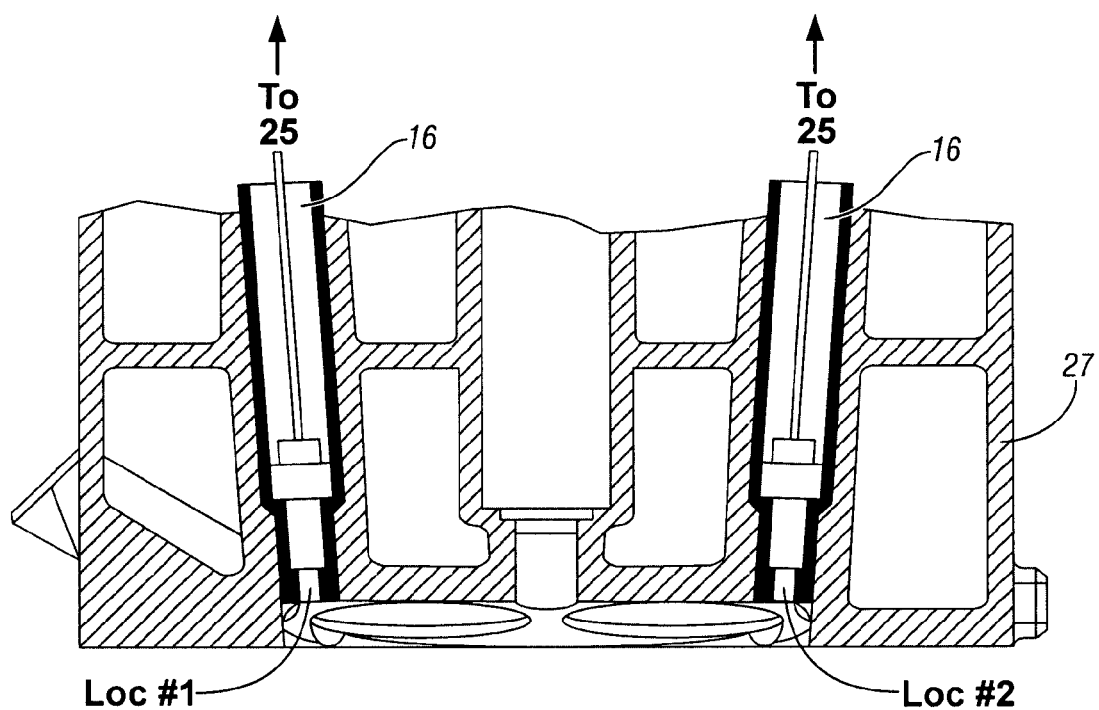
FIG. 2 is a schematic illustration of a detail of an internal combustion engine, in accordance with the present disclosure.

Referring now to the drawings, wherein the showings are for the purpose of illustrating certain exemplary embodiments only and not for the purpose of limiting the same, FIGS. 1 and 2 comprise schematic diagrams of an internal combustion engine 10 and control system 25 which has been constructed in accordance with an embodiment. The disclosure is applied as an element of an overall control scheme for an internal combustion engine. In this embodiment, the exemplary engine comprises a multi-cylinder spark ignition, direct-injection, gasoline, four-stroke internal combustion engine adapted to operate under a controlled auto-ignition process, also referred to as homogenous-charge, compression-ignition ('HCCI').

The exemplary engine 10 comprises: a cast-metal engine block with a plurality of cylinders formed therein, one of which is shown, and an engine head 27. Each cylinder comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant sensor 37, operable to monitor temperature of the coolant fluid, is located at an appropriate location, and provides a parametric signal input to the control system 25 useable to control the engine.

Each moveable piston 11 comprises a device designed in accordance with known piston forming methods, and includes a top and a body which conform substantially to the cylinder in which it operates. The top area of the piston, or crown, is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35 and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23. A direct injection fuel injector 12, spark plug 14, and a combustion chamber deposit sensing device 16 are each preferably mounted in the engine head, as described hereinbelow. The direct injection fuel injector 12, spark plug 14, and combustion chamber deposit sensing device 16 are each signally and/or operatively connected to the control system 25.

The intake and exhaust valves 21, 23 each have a head portion that includes a top surface that is exposed to the combustion chamber. Each valve 21, 23 has a stem that is connected to a valve actuation device. Valve actuation devices (not shown) can comprise any one of a plurality of known devices that are operable to control timing, duration, and magnitude of opening and closing of each of the valves, either in concert, e.g. a camshaft, or separately using individual actuation devices, and are not described in detail herein. The valve actuation devices are preferably operably controlled by the control system 25 according to known predetermined control schemes. Specific details of control schemes to control opening and closing of the valves are known and not detailed herein.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas feedstream, and determine parameters associated therewith. The exhaust gas sensor 40 can comprises any one of several known sensing devices operative to provide parametric values for the exhaust gas feedstream, including air/fuel ratio, exhaust gas constituents, e.g. NOx, CO, HC, and others. The aforementioned sensors and metering devices each provide a signal as a parametric input to the control system 25. These parametric inputs can be used by the control system to determine combustion performance measurements.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and, driveability. The control system 25 is operably connected to a plurality of devices through which an operator typically controls or directs operation of the engine. Exemplary operator inputs include an accelerator pedal, a brake pedal, transmission gear selector, and, vehicle speed cruise control when the engine is employed in a vehicle. The control system may communicate with other controllers, sensors, and actuators via a local area network ('LAN') bus (not shown) which preferably allows for structured communication of control parameters and commands between various controllers.

The control system 25 is operably connected to the engine 10, and functions to acquire parametric data from sensors, and control a variety of actuators, respectively, of the engine 10 over a plurality of discrete lines collectively shown as aggregate line 45.

The control system 25 receives an engine torque command, and generates a desired torque output, based upon the operator inputs. Engine operating parameters that are typically sensed by control system 25 using the aforementioned sensors include engine coolant temperature, crankshaft rotational speed ('RPM') and position, manifold absolute pressure, ambient air flow and temperature, and, ambient air pressure. Combustion performance measurements typically comprise measured and inferred combustion parameters, including air/fuel ratio, location of peak combustion pressure ('LPP'), amongst others.

The control system 25 preferably comprises a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer.

Algorithms for engine control are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the engine, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event.

Combustion chamber deposit parameters can be employed by an engine control system. An exemplary method and apparatus to control and operate an internal combustion engine using combustion chamber deposit parameter is disclosed in detail in commonly assigned U.S. patent application Ser. No. 11/398,776, now U.S. Pat. No. 7,246,597 entitled METHOD AND APPARATUS TO OPERATE A HOMOGENEOUS CHARGE COMPRESSION-IGNITION ENGINE, which is incorporated herein by reference. A method and apparatus to operate an exemplary engine to compensate for effects of CCDs on combustion and overall engine operation is disclosed therein.

The present disclosure includes a method and a control system for the aforementioned internal combustion engine, wherein a combustion parameter is monitored, and a combustion chamber deposit parameter is determined based upon the monitored surface temperature characteristics or other combustion parameters. Monitoring the combustion parameter comprises the control system signally connected to one of several exemplary sensing devices 16, described hereinbelow, which are operative to monitor parameters of the combustion chamber.

The method and apparatus to determine a parameter for combustion chamber deposits during ongoing engine operation is now described. The sensing device 16 to determine a parameter for CCDs includes, for example, an in-cylinder device operable to detect changes in heat flux caused by a layer of deposits. The sensing device can comprise some form of in-cylinder pressure measurement. The sensing device can comprise a device to determine fluorescence of a thermo-sensitive coating on a wall of the combustion chamber.

Figure 3:
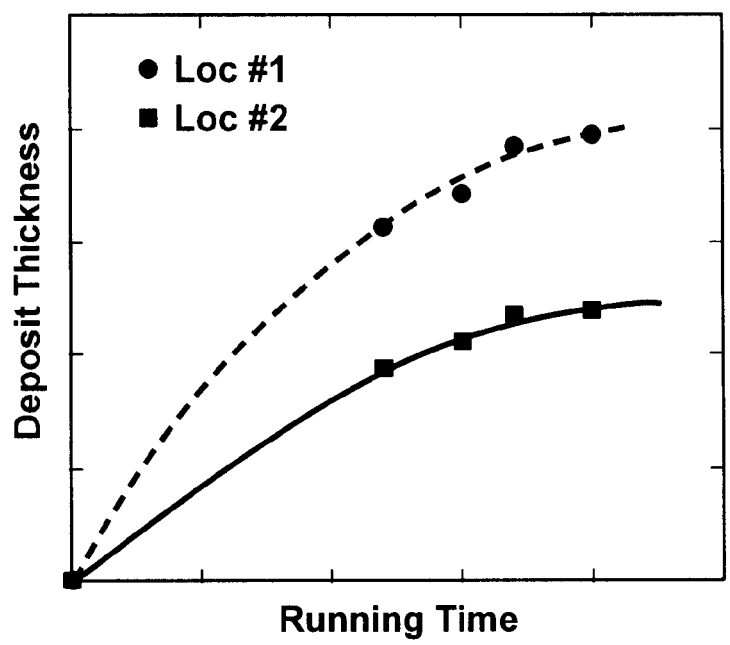
FIGS. 3, 4, 5, and 6 are datagraphs, in accordance with the present disclosure.

Referring now to FIGS. 2, 3, 4, 5, and 6, the sensing device 16 comprises a temperature sensing device. FIG. 2 is a schematic diagram showing the exemplary engine cylinder head 27 having a pair of exemplary temperature sensors 16 inserted therein, at two locations, Loc #1 and Loc #2. Location of a temperature sensor in a specific combustion chamber is application-specific, with a location defined based upon an ability to accurately measure CCDs in the chamber and other factors. A given application may have a single sensor for an engine, a single sensor for each cylinder, or multiple sensors for one or more cylinders, depending on factors outside the scope of the this disclosure. The temperature sensor 16 comprises known fast-response coaxial J-type thermocouples used for measurement of instantaneous surface temperature and heat flux at the surface of the combustion chamber on the head 27. Each sensor is mounted in the cylinder head so that a distal tip surface of the sensor is flush with the combustion chamber surface. The sensor is preferably attached to the end of long sleeves which are themselves mounted into the cylinder head. In operation, a tip surface of each sensor 16 is exposed to combustion gases in the combustion chamber. Combustion chamber deposits are able to form on the end of the tip surface, thus affecting temperature monitoring performance of the sensor. Depending on sensor location, and engine operating time and engine operating conditions, CCD growth rates change and the thickness on the tip surface varies, as depicted in FIG. 3 for Loc #1 and Loc #2. The formation of CCD on the sensor tip surface changes the measured surface temperature profile, directly measurable in accordance with the level of CCD deposition on top of it.

Figure 4:
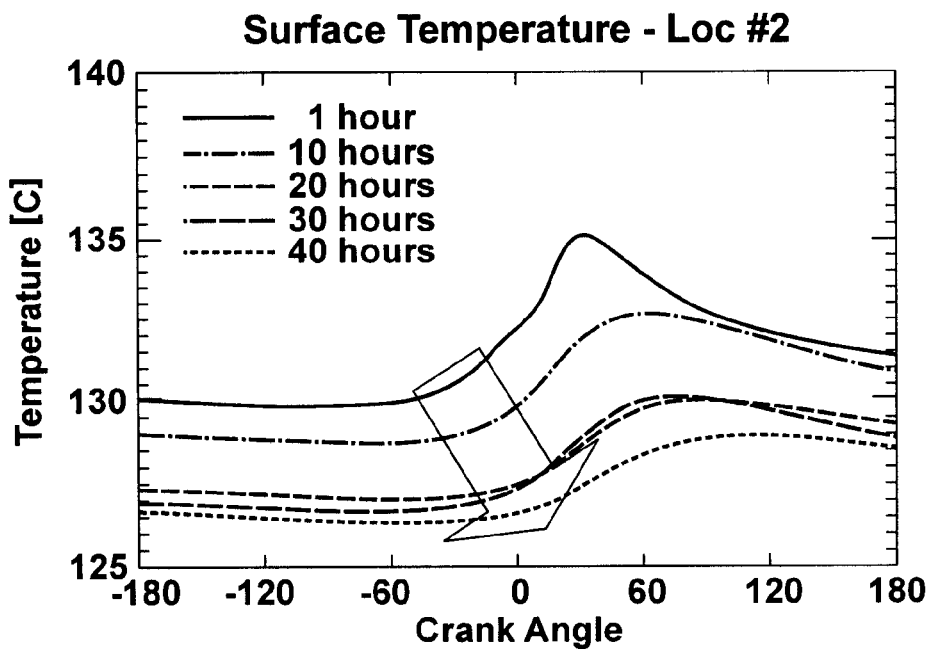
Figure 5:
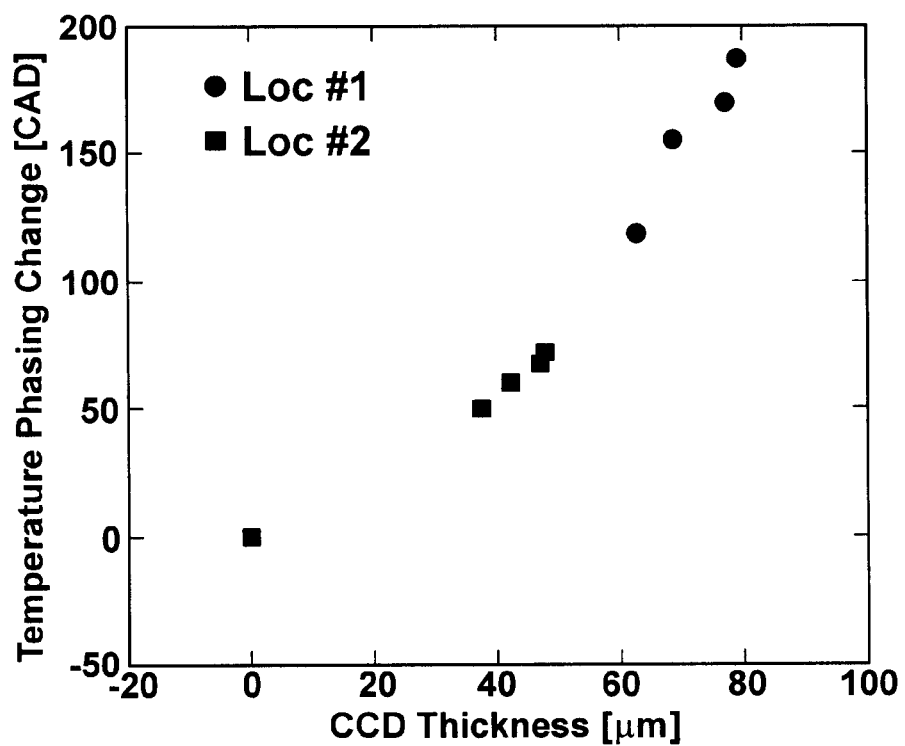

FIGS. 4 and 5 comprise exemplary datagraphs, derived experimentally using an experimental HCCI engine consistent with the engine described with reference to FIG. 1, having the heat-flux sensors 16 as shown in FIG. 2 and as described hereinabove. Referring now to FIG. 4, there is shown a relationship between the magnitude of peak temperature and the phasing of peak temperature relative to engine crank angle (measured with the crank sensor 31) and CCD thickness at the tip surface, based on an analysis of a one-dimensional heat diffusion process. Referring now to FIG. 5, the datagraph demonstrates results of an analysis which shows a relationship between in-cylinder CCD formation and signal output from the sensor 16. The experimental results demonstrate a relationship between CCD thickness, measured in micrometers, and a change in phase of peak surface temperature, as measured in crank angle degrees. Therefore, the sensor 16, comprising the fast thermocouple device located in the cylinder head to obtain surface temperature measurements, can be used to monitor CCD thickness, based upon the relationship between phasing of the peak temperature and the CCD layer thickness, which can be the CCD input signal to the control system 25.

Figure 6:
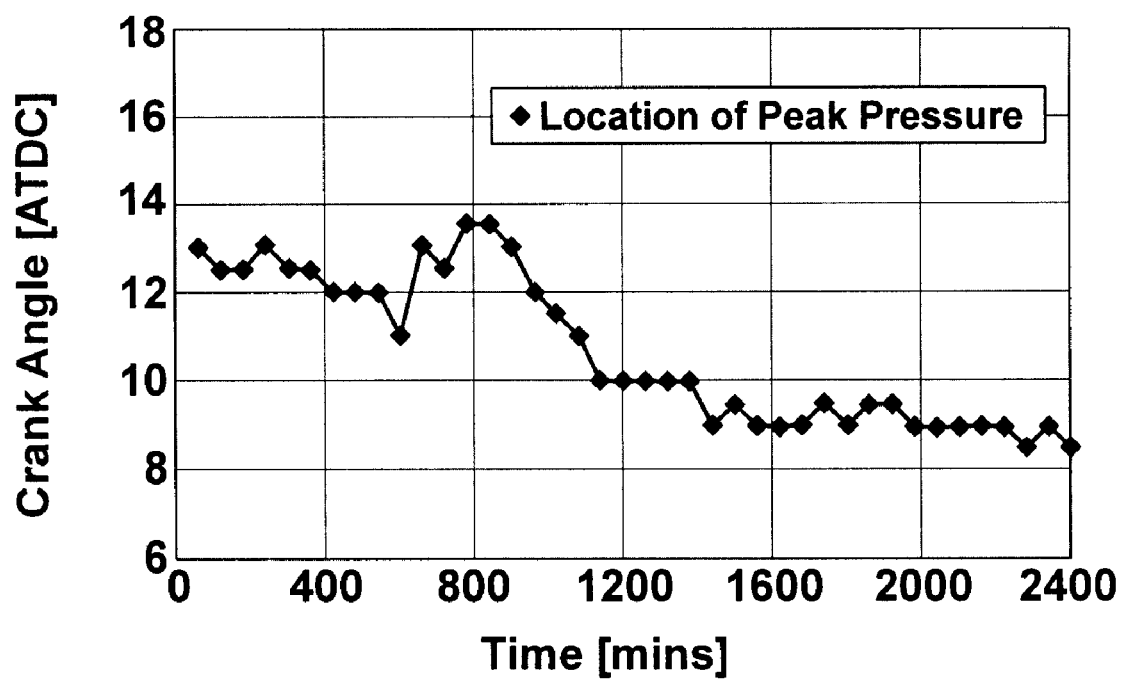

Referring now to FIG. 6, a data graph analogous to the data previously referenced with regard to FIGS. 4 and 5, is shown. The results in FIG. 6 demonstrate a change in location of peak cylinder pressure ('LPP') measured in crank angle (after top-dead-center, or 'ATDC') as a function of operating time. The data in FIGS. 4, 5, and 6 clearly demonstrate that a causal relationship can be established between surface temperature, which is measurable, CCD thickness, and LPP, the combustion performance characteristic of interest which can be used in a control system for controlling the HCCI engine.

Alternatively, the sensing device 16 can comprise a cylinder pressure sensing device, wherein the pressure sensing device has a sensing element operable to directly measure in-cylinder pressure in real-time. Alternatively the cylinder pressure sensing device can comprise a device having a sensing element operable to measure an external indicator of in-cylinder pressure, including, e.g. a pressure sensor mounted at a spark-plug boss operative to monitor pressure thereat which is correlatable to in-cylinder pressure. Regardless of the location of the pressure sensor, the sensor quantifies a combustion parameter comprising a measure of cylinder pressure, including a peak pressure level measured each engine cycle, and correlated to an angular location, to provide a combustion parameter interpretable as the location of peak pressure ('LPP'). In this configuration, the control system is operative to learn, or map, combustion rates and corresponding cylinder pressures for 'normal' operation at specific engine operating points, i.e. engine speed/load conditions. The control system 25 can then infer that a pressure deviation from the mapped pressure at a specific operating point indicates a change in magnitude of CCDs. The inference is based upon an analysis that a change in combustion, either in a crank angle location of peak pressure, and/or a magnitude of peak pressure, is caused by a change in magnitude of CCDs. This difference in magnitude and location of peak pressure can be used as an input to the engine control system which can then compensate for the degree of CCD coverage in the chamber and its influence on HCCI combustion.

Alternatively, the sensing device 16 can comprise a device and system which characterizes combustion, including a device which monitors an electrical signal from the spark plug, e.g. an ionization signal, and determines in-cylinder characteristics therefrom. A known ionization sensing device can be used to determine crank angle location of peak cylinder pressure, which is useable as described hereinabove.

Alternatively, a laser diagnostic device (not shown) located to monitor in-cylinder operation can be used to quantify in-cylinder CCD formation status. In this embodiment, phosphorescent coatings are applied to at least a portion of the combustion chamber, e.g. the head, a valve, or a portion of the top of the piston. The applied phosphorous coatings become excited when exposed to particular wavelengths of laser light. The decay time of this excitation directly correlates with the temperature of the coating, and the combustion chamber surface to which it is applied. The changes in either instantaneous or average local temperature can be detected using the laser diagnostic device. As CCD form over a coated surface, they affect temperatures and this result can be used as an indicator in the control system 25.

Changes in combustion chamber parameters with ongoing engine operation are now described. When the combustion chamber is initially conditioned, there are specific engine conditions, e.g. prolonged high engine load operation, that lead to reduced CCD thickness. Peak surface temperature changes and crank angle phasing advances with changes in CCD thickness, and this information is processed in the engine controller to estimate a change in thickness. Depending on operating time and operating conditions, CCD growth rates change and vary, as shown with reference to FIGS. 4 and 5.

The disclosure has been described with specific reference to an overall control scheme for operating an internal combustion engine using the controlled auto-ignition process, for which the disclosure has specific relevance. It is understood that further modifications and alterations may occur to others upon reading and understanding the specification, including application to other devices utilizing internal combustion. The disclosure is intended to include all such applications, modifications, and alterations insofar as they come within the scope of the disclosure.

The invention claimed is:

1. Method for determining a parameter for combustion chamber deposits of an internal combustion engine adapted to be operative in a controlled auto-ignition combustion mode, said engine comprising a spark-ignition, direct-injection, four-stroke, internal combustion engine including a variable volume combustion chamber defined by a piston reciprocating within a cylinder between top-dead-center and bottom-dead-center points and a cylinder head, said piston operably connected to a rotating crankshaft, the method comprising:
   monitoring a combustion parameter;
   determining a combustion chamber deposit parameter based upon the combustion parameter; and
   wherein monitoring the combustion parameter comprises monitoring a combustion chamber surface temperature and a related engine crank angle.

2. The method of claim 1, wherein determining a combustion chamber deposit parameter based upon the combustion parameter comprises:
   determining magnitude of combustion chamber deposits based upon an engine crank angle at which a peak combustion chamber surface temperature occurs during an engine cycle.

3. Method for determining a parameter for combustion chamber deposits of an internal combustion engine adapted to be operative in a controlled auto-ignition combustion mode, said engine comprising a spark-ignition, direct-injection, four-stroke, internal combustion engine including a variable volume combustion chamber defined by a piston reciprocating within a cylinder between top-dead-center and bottom-dead-center points and a cylinder head, said piston operably connected to a rotating crankshaft, the method comprising:
   monitoring a combustion parameter comprising
      monitoring a related engine crank angle,
      determining an in-cylinder combustion pressure parameter during each engine cycle, and
      determining the combustion pressure parameter based upon a peak in-cylinder pressure and the crank angle location of the peak in-cylinder pressure; and
   determining a combustion chamber deposit parameter based upon the combustion parameter.

4. The method of claim 3, wherein determining the in-cylinder combustion pressure parameter comprises monitoring output of an in-cylinder pressure sensing device.

5. The method of claim 3, wherein determining the in-cylinder combustion pressure parameter comprises monitoring an in-cylinder spark ionization signal.

6. A method for operating a multi-cylinder direct-injection, four-stroke internal combustion engine capable of operating with a controlled auto-ignition process, comprising:
   determining a parametric measure of combustion chamber deposits; and,
   controlling engine operation based upon the combustion chamber deposit parameter,
   wherein determining a parametric measure of combustion chamber deposits comprises: monitoring a combustion parameter and
   determining a parametric measure of combustion chamber deposits based upon said combustion parameter comprising determining magnitude of combustion chamber deposits based upon an engine crank angle at which a peak combustion chamber surface temperature occurs during an engine cycle.

7. The method of claim 6, wherein monitoring the combustion parameter further comprises:
   monitoring a related engine crank angle;
   determining an in-cylinder combustion pressure parameter during each engine cycle; and
   determining the combustion pressure parameter based upon a peak in-cylinder pressure and the crank angle location of the peak in-cylinder pressure.

8. The method of claim 7, wherein determining the in-cylinder combustion pressure parameter comprises monitoring output of an in-cylinder pressure sensing device.

9. The method of claim 7, wherein determining the in-cylinder combustion pressure parameter comprises monitoring an in-cylinder spark ionization signal.

* * * * *